(12) United States Patent
Song et al.

(10) Patent No.: US 9,163,784 B2
(45) Date of Patent: Oct. 20, 2015

(54) DEVICE AND METHOD FOR REDUCING TEMPERATURE OF BOMBE USING LATENT HEAT OF LPG VAPORIZATION

(75) Inventors: Ju Tae Song, Suwon-si (KR); Cheol Hun Cho, Suwon-si (KR); Myeong Hwan Kim, Hwaseong-si (KR); Chang Han Kim, Gwangju (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 849 days.

(21) Appl. No.: 13/428,466

(22) Filed: Mar. 23, 2012

(65) Prior Publication Data

US 2013/0146145 A1 Jun. 13, 2013

(30) Foreign Application Priority Data

Dec. 12, 2011 (KR) ........................ 10-2011-0132666

(51) Int. Cl.
*F17C 5/00* (2006.01)

(52) U.S. Cl.
CPC ......... *F17C 5/007* (2013.01); *F17C 2205/0335* (2013.01); *F17C 2205/0376* (2013.01); *F17C 2205/0391* (2013.01); *F17C 2221/035* (2013.01); *F17C 2223/0153* (2013.01); *F17C 2223/033* (2013.01); *F17C 2225/0153* (2013.01); *F17C 2225/033* (2013.01); *F17C 2225/043* (2013.01); *F17C 2227/0135* (2013.01); *F17C 2227/0339* (2013.01); *F17C 2227/0369* (2013.01); *F17C 2250/032* (2013.01); *F17C 2250/043* (2013.01); *F17C 2250/0439* (2013.01); *F17C 2250/0491* (2013.01); *F17C 2250/0631* (2013.01); *F17C 2260/021* (2013.01); *F17C 2265/065* (2013.01);*F17C 2270/0168* (2013.01); *Y02E 60/321* (2013.01); *Y10T 137/0318* (2015.04); *Y10T 137/6416* (2015.04)

(58) Field of Classification Search
CPC ............. F17C 5/007; F17C 2205/0391; F17C 2221/035; F17C 2223/0153; F17C 2227/0369; F17C 2227/0358; F17C 2227/036; F17C 2227/0379; F17C 2227/0339; F17C 2260/025; F17C 2265/065
USPC ..................................... 141/82; 137/334, 339
See application file for complete search history.

(56) References Cited

U.S. PATENT DOCUMENTS 3,191,395 A * 6/1965 Mather et al. .................. 62/47.1
4,680,937 A * 7/1987 Young ............................ 62/47.1

(Continued)

FOREIGN PATENT DOCUMENTS

| JP | 2004-300978 A | 10/2004 |
| JP | 2005-139910 A | 6/2005 |
| JP | 4393471 B2 | 10/2009 |

*Primary Examiner* — Timothy L Maust
*Assistant Examiner* — Timothy P Kelly
(74) *Attorney, Agent, or Firm* — Morgan, Lewis & Bockius LLP

(57) ABSTRACT

A device for reducing the temperature of a bombe, which stores liquefied petroleum gas (LPG) fuel and may be connected to a fuel supply line for supplying the fuel to an injector, using latent heat of LPG vaporization, may include a fuel pump installed in the bombe and connected to an end of the fuel supply line for pressurizing the fuel, a cut-off valve installed in the fuel supply line for selectively cutting off fuel supply to the injector, a fuel collection line branched from the fuel supply line to the inside of the bombe for collecting the supplied fuel into the bombe when the cut-off valve may be closed, and
  an injection nozzle connected to the fuel collection line and injecting the fuel collected through the fuel collection line into the inside of the bombe.

16 Claims, 4 Drawing Sheets

(56) References Cited

U.S. PATENT DOCUMENTS

| | | | |
|---|---|---|---|
| 5,548,961 A * | 8/1996 | Luger et al. | 62/47.1 |
| 6,216,675 B1 * | 4/2001 | Bennett | 123/541 |
| 2005/0263186 A1 * | 12/2005 | Ricco et al. | 137/392 |
| 2012/0189462 A1 * | 7/2012 | Hurley et al. | 417/1 |

* cited by examiner

DEVICE AND METHOD FOR REDUCING TEMPERATURE OF BOMBE USING LATENT HEAT OF LPG VAPORIZATION

CROSS-REFERENCE TO RELATED APPLICATION

The present application claims priority to Korean Patent Application No. 10-2011-0132666 filed Dec. 12, 2011, the entire contents of which is incorporated herein for all purposes by this reference.

BACKGROUND OF THE INVENTION

1. Field of the Invention

The present invention relates to a device and method for reducing the temperature of a bombe in a liquefied petroleum gas (LPG) vehicle. More particularly, it relates to a device for reducing the temperature of a bombe using the fact that LPG absorbs latent heat during vaporization to ensure smooth LPG filling, and a control method thereof.

2. Description of Related Art

Typically, an LPG vehicle is refueled at a filling station as shown in FIG. 1. An LPG storage 1 is located in the underground of the filling station, and the fuel is pumped by a filling pump 2 and transferred to each filling device. The filling device includes a filling gun 3 for supplying fuel to a fuel inlet of the vehicle, and a bombe 10 for storing fuel is mounted in the vehicle.

Here, the pressure at the filling state should be higher than that of the bombe 10 mounted in the vehicle such that the fuel injection and filling through the filling gun 3 is made possible. The pressure at the filling station may be determined as a sum of the pressure of the LPG storage 1 and the performance (about 8 bar) of the filling pump 2.

In the case of a vehicle using an existing liquid phase injection (LPI) system, the pressure at the filling station becomes lower than or equal to the pressure of the bombe 10 in the vehicle, and thus the LPG filling is not achieved. In particular, the temperature during a hot summer in Europe is 40° C., and the content of propane in LPG is 25 to 95%. Moreover, the temperature during a hot summer in Australia is 50° C., and the content of propane in LPG is 50 to 100%, for example. Thus, the pressure in the bombe 10 excessively increases under such conditions.

The increase in pressure of the bombe 10 of the vehicle causes an increase in temperature of the bombe 10, and this increase in temperature of the bombe 10 is caused by a fuel return system of an LPI engine as shown FIG. 2. FIG. 2 is a schematic diagram showing a fuel circulation system in a conventional LPI system.

In the LPI system, LPG is injected from a filling gun 3 provided with a nozzle into a bombe 10 through an LPG filter and an over-current protection (OCP) valve. The high-pressure liquid phase fuel in the bombe 10 is supplied to an engine through a fuel supply line, and extra fuel and fuel heated by the engine are reintroduced into the bombe 10 through a fuel return line. Here, the temperature in the bombe 10 is increased by the heated fuel to vaporize the liquid fuel, and thus the internal pressure of the bombe 10 also increases. As such, the increase in pressure of the bombe 10 may cause the problem of poor filling in the vehicle employing the LPI system.

In order to solve such a problem and ensure smooth LPG filling, it is necessary to substantially reduce the temperature of the bombe 10 by more than 25° C. or increase the pressure at the filling station by more than 6.1 bar. Conventional methods generally include a method of minimizing the flow of return fuel and a cooling method of reducing the temperature of the return fuel by heat exchange.

However, in the case of the method of minimizing the flow of return fuel by installing a solenoid valve in the fuel return line, the pressure at an injector excessively increases, and the startability and operability deteriorate. Moreover, in the case of a method using a system in which the return fuel is completely eliminated, it is impossible to collect fuel remaining in the injector after starting off, which causes injector leakage due to fuel vaporization, and the startability and operability also deteriorate.

Further, in the cooling method of reducing the temperature of the return fuel by heat exchange, in the case of a method of exchanging heat with air conditioner coolant, which is disclosed in Korean Patent No. 10-1071236, it is necessary to forcibly drive an air conditioner at a predetermined fuel temperature, which reduces the fuel efficiency and competitiveness, increases the manufacturing cost, and reduces the efficiency of the air conditioner. Moreover, in the case of a method of exchanging heat with other fluids such as condensed water, air, etc., there is no significant effect of reducing the temperature.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for reducing the temperature of a bombe using latent heat of LPG vaporization, which can reduce the temperature in the bombe by cutting off fuel supply and collecting pressurized fuel into the bombe using the fact that LPG absorbs latent heat during vaporization, thereby ensuring smooth LPG filling.

In one aspect, a device for reducing the temperature of a bombe, which stores liquefied petroleum gas (LPG) fuel and is connected to a fuel supply line for supplying the fuel to an injector, using latent heat of LPG vaporization, may include a fuel pump installed in the bombe and connected to an end of the fuel supply line for pressurizing the fuel, a cut-off valve installed in the fuel supply line for selectively cutting off fuel supply to the injector, a fuel collection line branched from the fuel supply line to the inside of the bombe for collecting the supplied fuel into the bombe when the cut-off valve is closed, and an injection nozzle connected to the fuel collection line and injecting the fuel collected through the fuel collection line into the inside of the bombe.

The device may include a controller for controlling the opening and closing of the cut-off valve and the operation of the fuel pump.

The device may include a three-way joint installed in the fuel supply line and connected to the fuel collection line.

The device may further include a relief valve installed in the fuel collection line to supply the fuel at an increased pressure to the injection nozzle.

The cut-off valve may be a solenoid valve.

The device may further include a filler door switch configured to input a fuel injection-ready signal to the controller when the filler door switch is on.

When the fuel injection-ready signal is input from the filler door switch, the controller closes the cut-off valve and drives the fuel pump such that the fuel is injected into the bombe through the fuel collection line.

The device may further include a sensor for measuring the temperature or pressure of the bombe, wherein the controller opens a filler door when the temperature or pressure of the bombe is reduced below a predetermined reference value.

In another aspect of the present invention, a method for reducing the temperature of a bombe using latent heat of liquefied petroleum gas (LPG) vaporization, may include inputting a fuel injection-ready signal, closing a solenoid valve connected to a fuel supply line when the fuel injection-ready signal is input, driving a fuel pump connected to the fuel supply line, and injecting fuel in the bombe into the bombe again through an injection nozzle of a fuel collection line connected to the fuel supply line.

After the injecting of the fuel, measuring temperature or pressure of the bombe and determining whether the measured temperature or pressure is below a predetermined reference value.

In the injecting of the fuel, the fuel is injected after increasing the pressure of the fuel through a relief valve connected between the fuel supply line and the injection nozzle in the fuel collection line.

The measuring of the temperature or pressure of the bombe is repeated when the measured temperature or pressure is above the predetermined reference value, the method further including opening a filler door when the measured temperature or pressure is below the predetermined reference value.

After the inputting of the fuel injection-ready signal, displaying information indicating that filling is in preparation through a cluster.

The method may further include displaying information indicating that the preparation for fuel filling is completed through the cluster when the filler door is opened.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
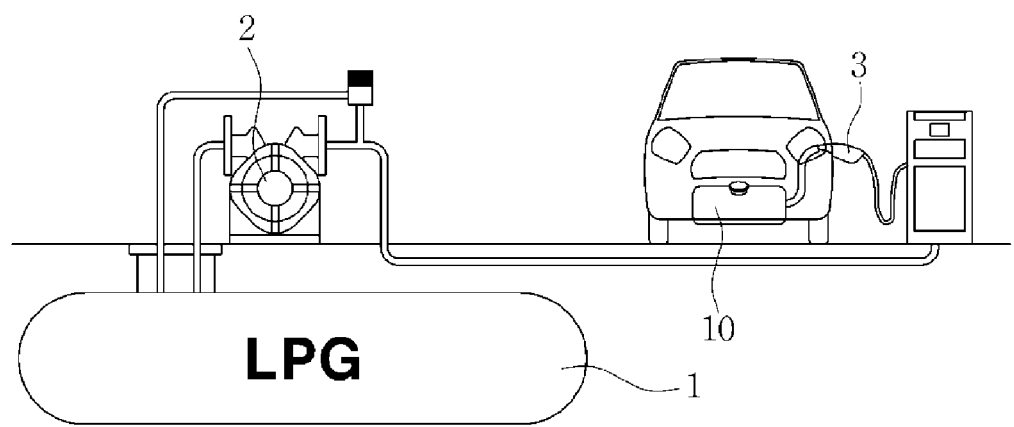
FIG. 1 schematically shows the structure of an LPG filling station.
Figure 2:
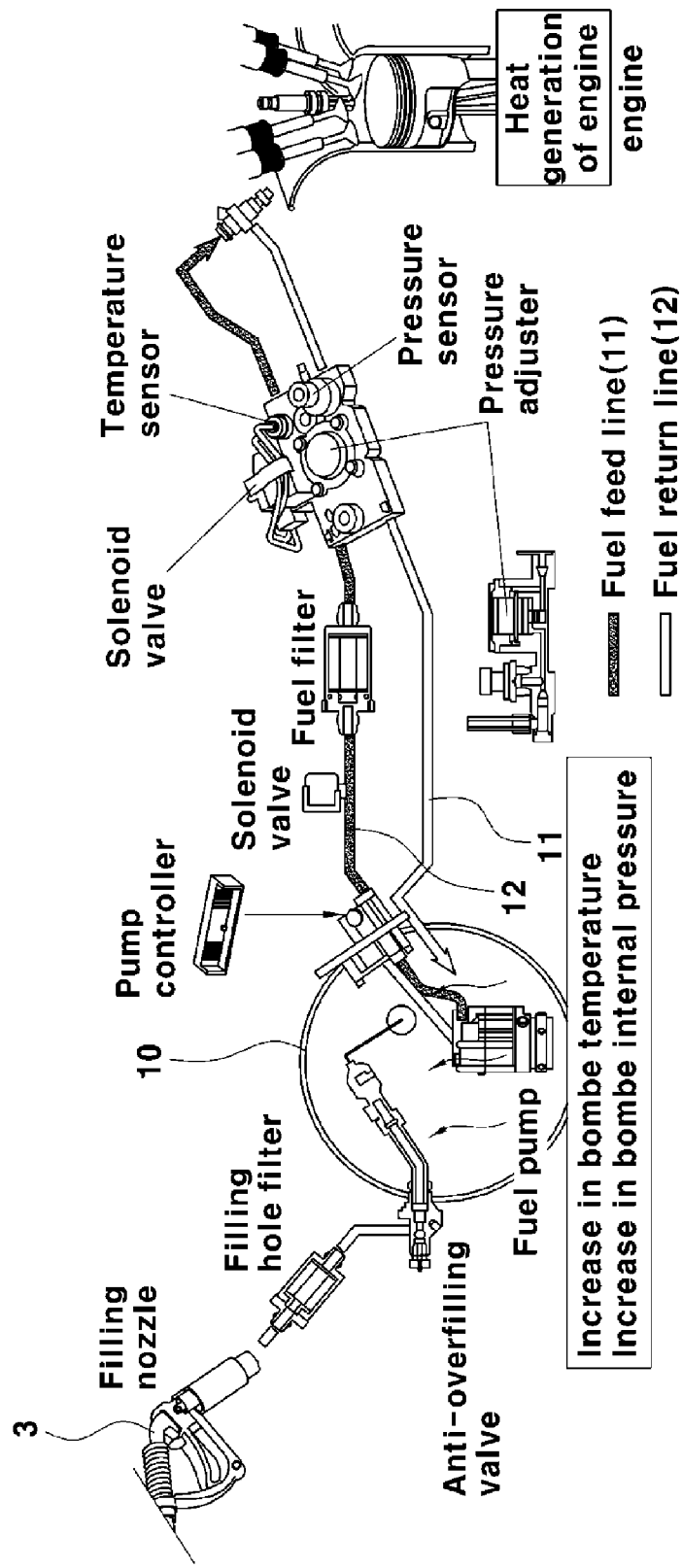
FIG. 2 schematically shows a fuel circulation system in a conventional LPI vehicle.

Reference numerals set forth in the Drawings includes reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention provides a device and method for reducing the temperature of a bombe using latent heat of LPG vaporization, which can rapidly reduce the temperature of the bombe using simple control logic when a driver wants to refuel his or her vehicle, thereby solving the problem of poor filling.

Figure 3:
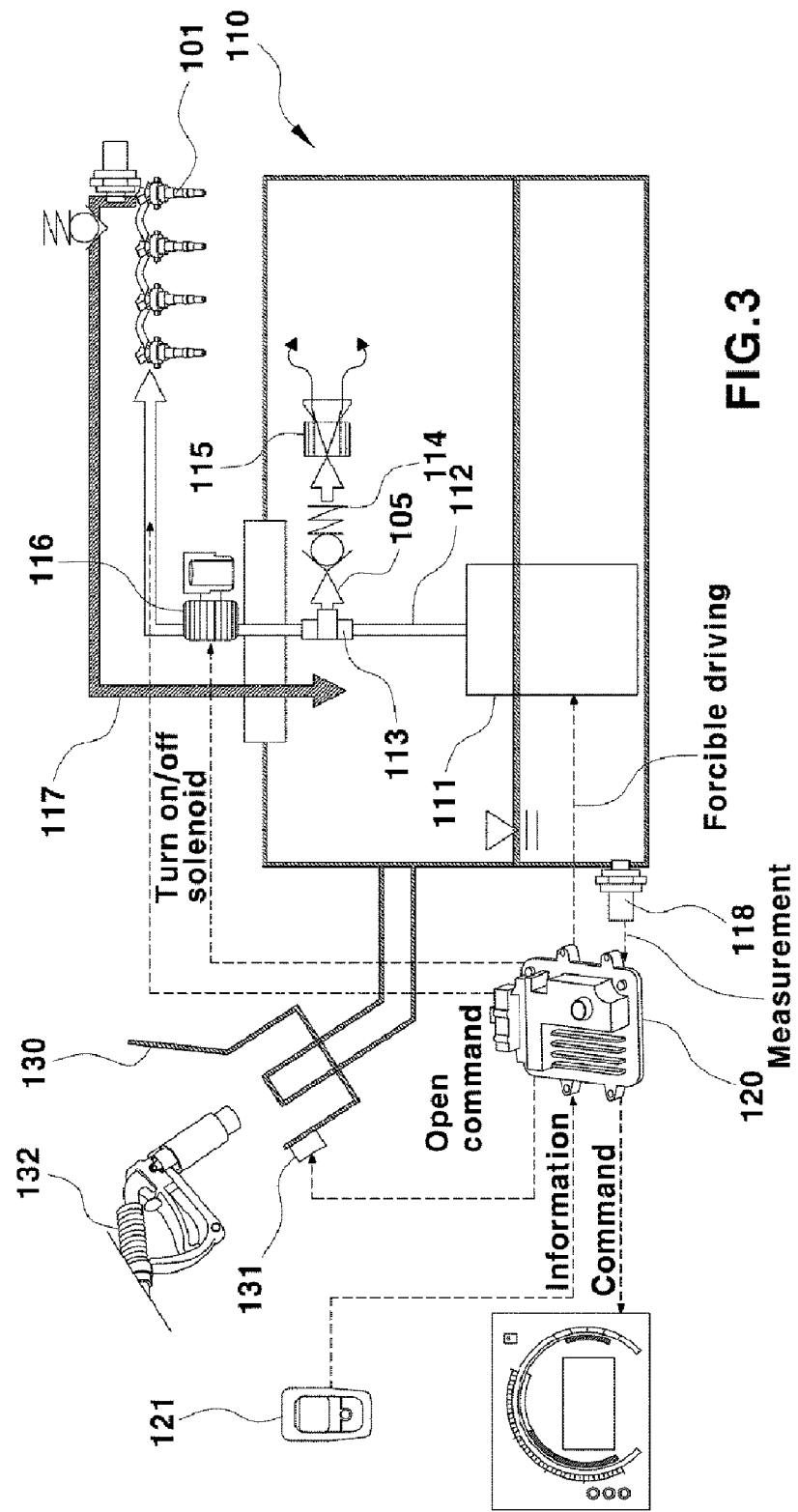
FIG. 3 schematically shows a device for reducing the temperature of a bombe using latent heat of LPG vaporization in accordance with an exemplary embodiment of the present invention.

FIG. 3 schematically shows a device for reducing the temperature of a bombe using latent heat of LPG vaporization in accordance with an exemplary embodiment of the present invention.

As shown in FIG. 3, the device for reducing the temperature of a bombe using latent heat of LPG vaporization in accordance with an exemplary embodiment of the present invention is configured to reduce the temperature of a bombe 110 storing LPG fuel in such a manner that pressurized LPG fuel is injected from the bombe 110.

The bombe 110 according to an exemplary embodiment of the present invention is connected to a fuel inlet such that fuel is injected from a fuel filling nozzle 132 and connected to a fuel supply line 112 for supplying fuel stored therein. Moreover, a fuel pump 111 is provided in the bombe 110 such that the fuel can be supplied to the fuel supply line 112.

Meanwhile, the device for reducing the temperature of the bombe in accordance with an exemplary embodiment of the present invention includes a fuel collection line 105 connected to the fuel supply line 112, a relief valve 114 and an injection nozzle 115, which are provided in the fuel collection line 105 so as to reduce the temperature of the bombe 110 using the latent heat of LPG vaporization.

The fuel collection line 105 is branched from the fuel supply line 112 through a three-way joint 113 to inject the fuel through the relief valve 114 and the injection nozzle 115 at an increased pressure compared to the pressure regulated by a regulator.

Moreover, the device according to the exemplary embodiment may be configured to include a cut-off valve 116 for cutting off the fuel supply before the fuel supplied through the fuel supply line 112 is injected through an injector 101 and a sensor 118 for measuring the temperature or pressure of the bombe 110. In particular, this cut-off valve 116 is configured as a solenoid valve to be rapidly opened and closed by an electrical signal of the controller.

Accordingly, in the exemplary embodiment of the present invention, when the cut-off valve 116 is closed, the fuel pumped by the fuel pump 111 does not flow through the fuel supply line 112 but is bypassed to the fuel collection line 105.

Moreover, the device according to the exemplary embodiment includes a controller 120 for controlling the operation of the fuel pump 111 and the opening and closing of the cut-off valve 116. The controller 120 receives a fuel injection-ready signal of a driver and, if it is determined that the fuel is being injected, controls the cut-off 116 and the fuel pump 111 to reduce the temperature of the bombe 110, thereby ensuring smooth filling.

Furthermore, the controller 120 according to the exemplary embodiment may be configured to receive temperature or pressure information measured by the sensor 118. Moreover, if it is determined that the temperature or pressure of the bombe 110 is lower than a predetermined reference value, the controller 120 determines that the fuel filling is possible and opens a filler door 130.

Here, the reference value with respect to the temperature or pressure of the bombe 110 is a predetermined value with respect to the temperature or pressure at which the fuel filling is possible and may be stored in the controller 120.

Moreover, the device according to the exemplary embodiment may be configured to include a filler door switch 121 for allowing the driver to input the fuel injection-ready signal, an electric filler door open switch 131 for opening the filler door 130, and a cluster for displaying information related to the current fuel injection-ready state in the process of reducing the temperature of the bombe 110 under the control of the controller 120, while they are not directly related to the reduction in the temperature of the bombe 110.

In the exemplary embodiment, the filler door open switch 131 may be configured to open the filler door 130 when the controller 120 determines that the fuel filling is possible. Moreover, when the control for reducing the temperature of the bombe 110 is performed, the cluster may be configured to display a message indicating that the fuel filling is in preparation and, if it is determined that the fuel filling is possible, display a message indicating that the fuel filling is possible.

Next, a technique for reducing the temperature of the bombe using latent heat of LPG vaporization in the device for reducing the temperature of the bombe in accordance with the exemplary embodiment will be described, in which the respective components will be described in detail.

First, in the device for reducing the temperature of the bombe using the latent heat of LPG vaporization in accordance with the exemplary embodiment, when a driver turns on the filler door switch 121 for the fuel filling, a fuel injection-ready signal is input to the controller 120. The controller 120 receives the fuel injection-ready signal of the user and transmits a drive signal for reducing the temperature of the bombe 110 to each component connected to the controller 120.

That is, as shown in FIG. 3, when the controller 120 receives information related to a fuel injection signal, the controller 120 closes the cut-off valve 116, a solenoid valve, and forcibly drives the fuel pump 111.

Here, since the cut-off valve 116 is already closed before the operation of the fuel pump 111, the fuel supplied through the fuel supply line 112 is bypassed to the fuel collection line 105 by the operation of the fuel pump 111.

Meanwhile, as shown in FIG. 3, since the relief valve 114 is provided in the fuel collection line 105, the bypassed fuel is pressurized above the opening pressure, and the pressurized fuel is injected into the bombe 110 through the injection nozzle 115.

Accordingly, in the exemplary embodiment, the fuel pressurized at high pressure is introduced into the bombe 110, which is a relatively low-pressure expansion area, to reduce the temperature of the bombe 110 using the latent heat of vaporization generated.

Meanwhile, the pressure sensor or temperature sensor in the exemplary embodiment periodically measures the pressure or temperature of the bombe 110 while the process of reducing the temperature of the bombe 110 using the latent heat of vaporization is repeated.

Therefore, if it is determined from the result of the measurement that the pressure or temperature of the bombe 110 is lower than a reference value, the controller 120 determines that the current bombe 110 can be filled and operates the filler door open switch 131 to open the filler door 130, thereby enabling the fuel filling.

Moreover, as shown in FIG. 3, the controller 120 in the exemplary embodiment may command the cluster to output current state information such as information indicating that the fuel filling is in preparation or information indicating that the preparation for fuel filling is completed.

Figure 4:
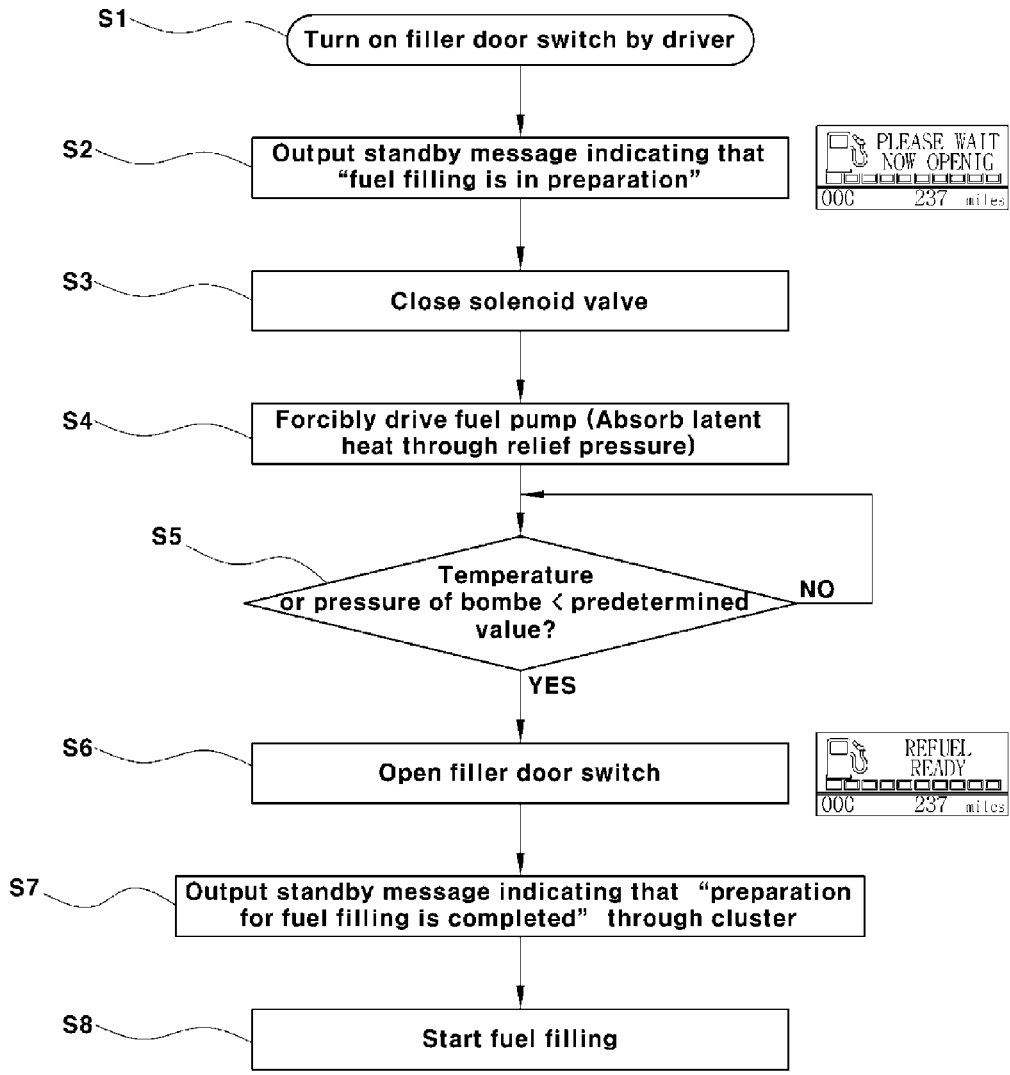
FIG. 4 is a flowchart showing the steps of a method for reducing the temperature of a bombe using latent heat of LPG vaporization in accordance with another exemplary embodiment of the present invention.

FIG. 4 sequentially shows the steps of a method for reducing the temperature of a bombe using latent heat of LPG vaporization in accordance with another exemplary embodiment of the present invention, which is implemented by the device for reducing the temperature of the bombe using the latent heat of LPG vaporization shown in FIG. 3.

Referring to FIG. 4, in the method for reducing the temperature of the bombe using the latent heat of LPG vaporization in accordance with another exemplary embodiment of the present invention, a step of inputting a fuel injection-ready signal, for example, a step in which a driver turns on the filler door switch is performed (S1). In this case, a standby message indicating that "the fuel filling is in preparation" may be output through the cluster (S2).

Then, for the preparation for fuel filling, the controller closes the solenoid valve (S3) and forcibly drives the fuel pump (S4), thereby absorbing latent heat of vaporization using the pressure adjusted by the relief valve.

During the process in which the latent heat of vaporization is absorbed, a step in which the temperature sensor or pressure sensor periodically measures the temperature or pressure of the bombe and compares the measured value with a reference value is performed (S5). Moreover, if it is determined that the temperature or pressure of the bombe is lower than the reference value, a step of determining that the bombe is sufficiently cooled and opening the filler door switch is performed (S6).

In this case, a standby message indicating that "the preparation for fuel filling is completed" may be output to the driver through the cluster (S7).

As a result, if the step of reducing the temperature of the bombe is completed for the preparation for fuel filling, the fuel filling nozzle is connected to the opened filler door, thereby starting the fuel filling (S8).

Therefore, the method for reducing the temperature of the bombe using the latent heat of LPG vaporization according to an exemplary embodiment of the present invention can reduce the temperature of the bombe to a state where the fuel filling is possible using simple control logic.

As described above, the device and method for reducing the temperature of the bombe using the latent heat of LPG vaporization according to an exemplary embodiment of the present invention has the following effects.

First, since the temperature of the bombe is reduced by the latent heat generated during vaporization of the collected fuel, the temperature of the bombe can be reduced while using the existing LPI system as it is, and thus it is possible to smoothly fill the LPG fuel under any conditions including during hot summers.

Second, since the simple and inexpensive configuration is introduced into the conventional LPI system and an underbody type bombe without a separate external device such as an air conditioner, cooler, condensed water, running wind, etc., it is possible to provide a high output and high fuel efficiency vehicle compared to an LPG system, thereby increasing the competitiveness. Moreover, since the inside of the bombe is directly cooled, compared to a conventional system in which a cooler is installed in the fuel return line, and thus the effect of reducing the temperature can be improved.

Third, the device for reducing the temperature of the bombe using the latent heat of LPG vaporization according to an exemplary embodiment of the present invention can effectively reduce the temperature of the bomber using simple control logic in which the controller controls the opening and closing of the cut-off valve and the operation of the fuel, and thus it is possible to simplify the design of the controller.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for reducing the temperature of a bombe, which stores liquefied petroleum gas (LPG) fuel and is connected to a fuel supply line for supplying the fuel to an injector, using latent heat of LPG vaporization, the device comprising:
    a fuel pump installed in the bombe and connected to an end of the fuel supply line for pressurizing the fuel;
    a cut-off valve installed in the fuel supply line for selectively cutting off fuel supply to the injector;
    a fuel collection line branched from the fuel supply line placed inside the bombe to an inside of the bombe for collecting the pressurized fuel into the bombe when the cut-off valve is closed;
    a relief valve installed in the fuel collection line to supply the fuel at an increased pressure;
    an injection nozzle injecting the fuel supplied from the relief valve into the inside of the bombe to vaporize the fuel,
    wherein a temperature of the inside of the bombe is reduced by the vaporization of the fuel.

2. The device of claim 1, including a controller for controlling the opening and closing of the cut-off valve and the operation of the fuel pump.

3. The device of claim 1, further including a three-way joint installed in the fuel supply line and connected to the fuel collection line.

4. The device of claim 3, further including a controller for controlling the opening and closing of the cut-off valve and the operation of the fuel pump.

5. The device of claim 1, further including a controller for controlling the opening and closing of the cut-off valve and the operation of the fuel pump.

6. The device of claim 1, wherein the cut-off valve is a solenoid valve.

7. The device of claim 1, further including a filler door switch configured to input a fuel injection-ready signal to a controller when the filler door switch is on.

8. The device of claim 7, wherein when the fuel injection-ready signal is input from the filler door switch, the controller closes the cut-off valve and drives the fuel pump such that the fuel is injected into the bombe through the fuel collection line.

9. The device of claim 6, further including a sensor for measuring the temperature or pressure of the bombe, wherein a controller opens a filler door when the temperature or pressure of the bombe is reduced below a predetermined reference value.

10. A method for reducing the temperature of a bombe using latent heat of liquefied petroleum gas (LPG) vaporization, the method comprising:
    inputting a fuel injection-ready signal;
    closing a solenoid valve connected to a fuel supply line when the fuel injection-ready signal is input;
    driving a fuel pump connected to the fuel supply line;
    increasing a pressure of a fuel through a relief valve connected between the fuel supply line and an injection nozzle positioned in a fuel collection line connected to the fuel supply line and placed inside the bombe; and
    injecting the fuel in the bombe into the bombe again through the injection nozzle to reduce a temperature of an inside the bombe by vaporizing the injected fuel.

11. The method of claim 10, further including, after the injecting of the fuel, measuring temperature or pressure of the bombe and determining whether the measured temperature or pressure is below a predetermined reference value.

12. The method of claim 10, wherein in the injecting of the fuel, the fuel is injected after increasing the pressure of the fuel through the relief valve connected between the fuel supply line and the injection nozzle in the fuel collection line.

13. The method of claim 12, further including, after the injecting of the fuel, measuring temperature or pressure of the bombe and determining whether the measured temperature or pressure is below a predetermined reference value.

14. The method of claim 13, wherein the measuring of the temperature or pressure of the bombe is repeated when the measured temperature or pressure is above the predetermined reference value, the method further including opening a filler door when the measured temperature or pressure is below the predetermined reference value.

15. The method of claim 10, further including, after the inputting of the fuel injection-ready signal, displaying information indicating that filling is in preparation through a cluster.

16. The method of claim 13, further including displaying information indicating that the preparation for fuel filling is completed through a cluster when the filler door is opened.

* * * * *